3,343,377
DAMPING DEVICE FOR A SHAFT WHICH IS SUBJECT SIMULTANEOUSLY TO LONGITUDINAL AND ANGULAR OSCILLATIONS
André Loupéré, Billiere, France, assignor to Societe Anonyme: Societe Nationale des Petroles d'Aquitaine, Paris, France
Filed May 12, 1965, Ser. No. 455,236
Claims priority, application France, May 15, 1964, 974,676
5 Claims. (Cl. 64—27)

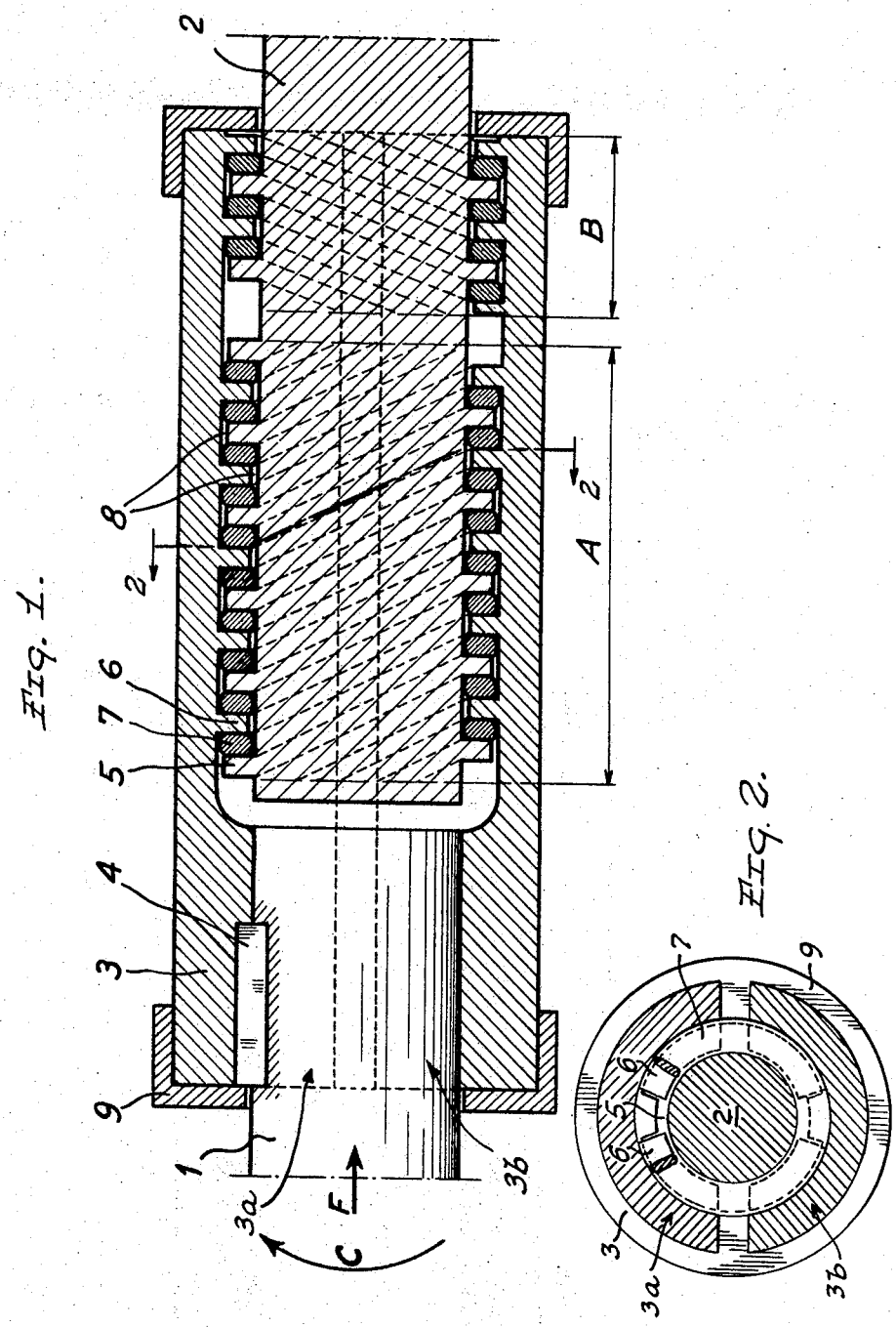

The present invention relates to a damping device for a shaft which is subjected simultaneously to longitudinal and angular oscillations.

Hitherto the simultaneous damping of the longitudinal oscillations and of the angular oscillations caused at one of the ends of and/or along a shaft, so that the dynamic amplification of this excitation is very weak along the said shaft, has not been achieved in a satisfactory manner.

The present invention has for a particular object the production of a damping device which enables the above-mentioned desired result to be satisfactorily achieved, and more particularly, when the shaft is loaded, a considerable continuous torqeu and longitudinal effort to be transmitted, even in conditions of high ambient temperature.

To this end according to the present invention there is provided a damping device comprising two co-axial shaft stems, the adjacent ends of which are slightly separated by a sleeve which is rigidly connected to the end of one of the shaft stems, a tapping provided in the sleeve, a treading provided on the corresponding end of the other shaft stem, and by a damping material inserted between the sides of the profiles of the threading and tapping.

The inclination of the helix of the threading and tapping may be selected so that the vector representing the relative displacement between the sleeve and the threaded shaft stem is of similar direction adjacent to the perpendicular to the helix.

The end of one of the shaft stems may be provided with two threadings and the sleeve provided with two tappings, the helix of the first threading and of the first tapping being of direction opposite that of the second threading and second tapping.

An annular space may be provided between the head of the threads of the shaft stem or of the sleeve and the base of the threads of the sleeve or of the threaded shaft stem.

The damping material is constituted by metal in the form of braided wires, or various rubber materials, or silicone fluids or gums or any other material presenting, during a deformation cycle, a hysteresis in the displacements rendering it capable of adsorbing work.

The height of the profile of the damping material may be greater than that of the profile of the threads of the threading and of the tapping, the radial clearances between the sleeve and the shaft portion which is not integral with the sleeve may be relatively large and may permit a disalignment between the two shaft stems.

The radial clearances between the sleeve and the shaft stem which is not integral with the sleeve are small so that the transverse stiffness of the assembly of the damping device is large, the bearings of the sleeve and of the shaft stem between which is produced a relative longitudinal and angular movement being previously treated by a known method such as sulfinusation.

The threadings and tappings may be discontinuous so as to arrange helically a series of cavities on the sleeve and ribs on the shaft stem or vice versa. It is apparent that these cavities will provide space for the expansion of the damping material during periods of increased stress upon the damping device and will thereby result in more effective damping of oscillations under high stress conditions than is possible without said cavities.

In order that the present invention may be more clearly understood reference will now be made to the accompanying drawing which shows an embodiment thereof solely by way of example. FIG. 1 illustrates an axial section through a damping device according to the invention and FIG. 2 is a vertical sectional view taken substantially along the line 2—2 of FIG. 1, upon which is illustrated the alternative embodiment of the invention whereby the threadings and tappings are made discontinuous.

The damping device comprises a first shaft stem 1 and a second shaft stem 2 arranged coaxially with respect to the first, as well as a sleeve 3 constituted in the example indicated in the drawing by two half shells 3a, 3b. It must be noted that by "shaft stem" all hollow or full shafts for transmission of motion must also be understood.

The shaft stem 1 is secured to the sleeve 3 by means of a key 4 engaged in corresponding grooves of the sleeve 3 and of the shaft stem 1.

The shaft stem 2 comprises a threading 5, the profile of which is preferably a rectangle or trapezium. The sleeve 3 is provided with a tapping 6 of shape corresponding to the threading 5. Between the sides of the threading 5 and of the tapping 6 is arranged a damping material 7. Consequently the side of a thread of the tapping 6 rests on the side of the adjacent thread of the threading 5 by means of the damping material 7. After aligning the two shafts 1, 2, one which is provided with the damping material 7, the two half shells 3a, 3b are placed about neighbouring ends of said shafts, said shells forming the sleeve if the latter must be constituted in two parts; if not, the one-piece sleeve is screwed on the shaft provided with damping material.

By conventional means, mechanical stops are provided, of which the role is to limit the relative longitudinal and angular displacement between the sleeve and the shaft portion which is not integral with this sleeve, in the hypothesis of an excess of axial and torque effort.

By way of example, the axial force F and the couple C applied on the shaft 1 and to be transmitted to the shaft 2 without transmission of longitudinal and angular oscillations to which the shaft 1 may be subjected, are diagrammatically indicated in the drawing.

By means of the present invention, the longitudinal force and the couple C impose on the threading 5 and on the tapping 6 a limited relative displacement. The inclination of the helix of the threading and tapping is selected so that a vector δ representing the relative displacement has a similar direction to the perpendicular to the helix. This relative displacement is useful for creating the desired damping stress for producing either a compression of a solid damping material, or shearing of a damping fluid. When a damping fluid is used, the flexible connection between the sleeve 3 and the shaft 2 is effected by means of a spring or of a device, the longitudinal and torsional stiffness of which are judiciously selected so that the maximum stresses applied to the shafts 1 and 2 do not cause a relative displacement of the threadings 5 and 6 causing a contact between the sides of the two threadings 5 and 6. Of course, in this case, sealing fitttings are likewise provided between the shaft 1 on the one hand and shaft 2 on the other hand.

As may be seen from the drawing, there is an annular space 8 between the head of the threads of the shaft 2 or of the sleeve 3 on the one hand, and the base of the threads of the sleeve 3 or of the shaft 2 on the other hand. By way of contrast, the annular space between the base of the threading 5 and the base of the tapping 6 may be completely filled with the damping material 7 as shown in FIGURE 1. The annular spaces 8 provide a volume for the expansion of the damping material during disalignment of the two shafts. In this way, possible transverse oscillations are also damped.

When a solid damping body such as of rubber, metal, silicone elastomers, etc., is used as a damping material, the solid damping body 7 in the shape of a coil or of a bar, is wound about the threads of the shaft 2.

The helical arrangement of the damping material 7 about the shaft 2 permits considerable variations of the volume of this material 7 and consequently the realisation of a very considerable damping effect. Thus it is possible to impart to the damping material the function of transmitting the longitudinal effort F and the couple C applied on the shaft 1, to the shaft 2, because the load to which the helix of the solid damping material 7 is subjected by linear unity is low.

When silicone elastomers are used as damping material, these may be moulded under pressure on the sides of the tapping 6 of the sleeve 3 or on the sides of the threading 5 of the shaft 2.

The shaft 2 as well as the sleeve 3 may present on the one hand, a first zone A in which the threading 5 and the tapping 6 are machined along a helix corresponding to a couple directed in one sense of rotation and on the other hand, a second zone B in which the helix of threading and of tapping has a sense of rotation contrary to that of the helix of the zone A, which enables a damping stress to be created in the sense of operation contrary to the previous one. The helix of the zone A and that of the zone B are thus arranged in a chevron pattern.

Generally, the present invention may be applied to any shaft or series of transmission shafts subjected simultaneously to a longitudinal and torsional force.

Examples of the application of the invention, are a drill shaft, and a line or lines of shafts of a ship.

As is known, in a drill shaft, the tool transmits to said shaft considerable longitudinal and torsional forces. In order to damp the axial and torsional shocks to which the tool is subjected, it is sufficient to place the damping device between two elements of the drill shaft.

In the case of a ship, torsional and longitudinal vibrations are also produced on the line of shafts between the engine and the propeller of the ship. The damping device according to the present invention suppresses the vibrations whilst allowing the effective transmission of the thrusts and couples applied to the line or lines of the ship.

Of course, the embodiment of the previously described object has been given only by way of non-limiting example. Numerous modifications may be made in the damping device without departing from the scope of the invention.

I claim:
1. A device for damping longitudinal, angular and transverse oscillations to which a shaft is subjected, comprising two coaxial shaft stems having adjacent ends spaced apart by means of a sleeve, said sleeve being integral with one of said shaft stems and surrounding the other said shaft stem; a tapping provided in said sleeve to define threads on an inner surface thereof; a threading on the corresponding end of the other shaft stem of a diameter which defines an annular space between the head of the threads of the shaft stem and the base of the threads of the sleeve; and a damping material interposed between the sides of the profile of the threading and the tapping, said annular space being void of said damping material.

2. A damping device as described in claim 1 wherein a second annular space is defined between the head of the threads of the sleeve and the base of the threads of the shaft stem, said second annular space also being void of said damping material.

3. A damping device as described in claim 1 wherein the height of the profile of the damping material is greater than that of the profile of the threads of the threading and of the tapping, and a radial clearance is provided between said sleeve and the shaft portion not integral with said sleeve, which is sufficient to permit a disalignment between the shaft stems.

4. A damping device as described in claim 1 wherein a radial clearance is provided between said sleeve and the shaft portion not integral with said sleeve which is small, whereby the transverse stiffness of the assembly of the damping device is great and bearings are provided on the sleeve and the shaft stem between which a relative longitudinal and angular movement is produced.

5. A damping device is described in claim 1 wherein the threadings and tappings are partially discontinued to form a series of cavities in the sleeve threads and shaft stem threads.

References Cited
UNITED STATES PATENTS

| | | | |
|---|---|---|---|
| 2,092,613 | 9/1937 | Olley | 64—27 |
| 2,231,037 | 2/1941 | Taylor. | |
| 2,235,605 | 3/1941 | Bugatti | 64—27 X |
| 2,449,841 | 9/1948 | Claypool et al. | 175—321 |
| 2,812,648 | 11/1957 | Croset | 64—26 |
| 2,869,858 | 1/1959 | Hartwell | 267—1 |

FRED C. MATTERN, JR., *Primary Examiner.*

HALL C. COE, *Examiner.*